United States Patent [19]

Hartwig et al.

[11] Patent Number: 4,601,351
[45] Date of Patent: Jul. 22, 1986

[54] ELECTRICALLY DRIVEN HAMMER MACHINE

[75] Inventors: Carl S. M. Hartwig, Täby; Sven H. Johansson, Åmål; Erik A. Ljung, Stockholm, all of Sweden

[73] Assignee: Institut CERAC S.A., Ecublens, Switzerland

[21] Appl. No.: 532,192

[22] Filed: Sep. 14, 1983

[30] Foreign Application Priority Data

Sep. 22, 1982 [CH] Switzerland .................. 5600/82

[51] Int. Cl.⁴ ............................................ B25D 13/00
[52] U.S. Cl. .................................... 173/117; 173/123
[58] Field of Search ............... 173/104, 116, 117, 118, 173/119; 318/138, 801, 803; 310/50, 47

[56] References Cited

U.S. PATENT DOCUMENTS

| | | | |
|---|---|---|---|
| 3,718,193 | 2/1973 | Wanner | 173/117 |
| 3,741,317 | 6/1973 | Unterschweiger et al. | 173/117 |
| 4,099,107 | 7/1978 | Eder | 318/802 |
| 4,123,692 | 10/1978 | Gilmore et al. | 318/811 |
| 4,311,933 | 1/1982 | Riggs et al. | 318/138 |

Primary Examiner—E. R. Kazenske
Assistant Examiner—James L. Wolfe
Attorney, Agent, or Firm—Eric Y. Munson

[57] ABSTRACT

An electrically driven hammer machine comprising a driving piston (103) and a hammer piston (104) driven by the driving piston via a pressure gas cushion (106). The driving piston is driven by a brushless alternating current motor (101) via a crank mechanism (105). A solid state inverter (107) in the power supply conduit (102) supplies power of variable amplitude and frequency to the motor.

3 Claims, 7 Drawing Figures

ELECTRICALLY DRIVEN HAMMER MACHINE

The present invention relates to an electrically driven hammer machine.

In prior art electrically driven hammer machines the motor has only one operating speed. This is a drawback for instance during collaring of a drill hole. In this case the drill bit has a tendency to move about on the rock face.

The present invention aims at avoiding this problem by providing a motor drive where the motor is supplied with alternating current of variable frequency and amplitude. By driving the motor through a solid state inverter it becomes possible to use frequencies being substantially higher than ordinary network frequencies so that smaller and thus lighter motors can be used. It is also possible to take advantage of motors having four or even more poles. The invention is defined by the appended claims.

An embodiment of the invention is described below with reference to the accompanying drawings in which FIG. 1 shows an electrically driven hammer machine.

Figure 1:
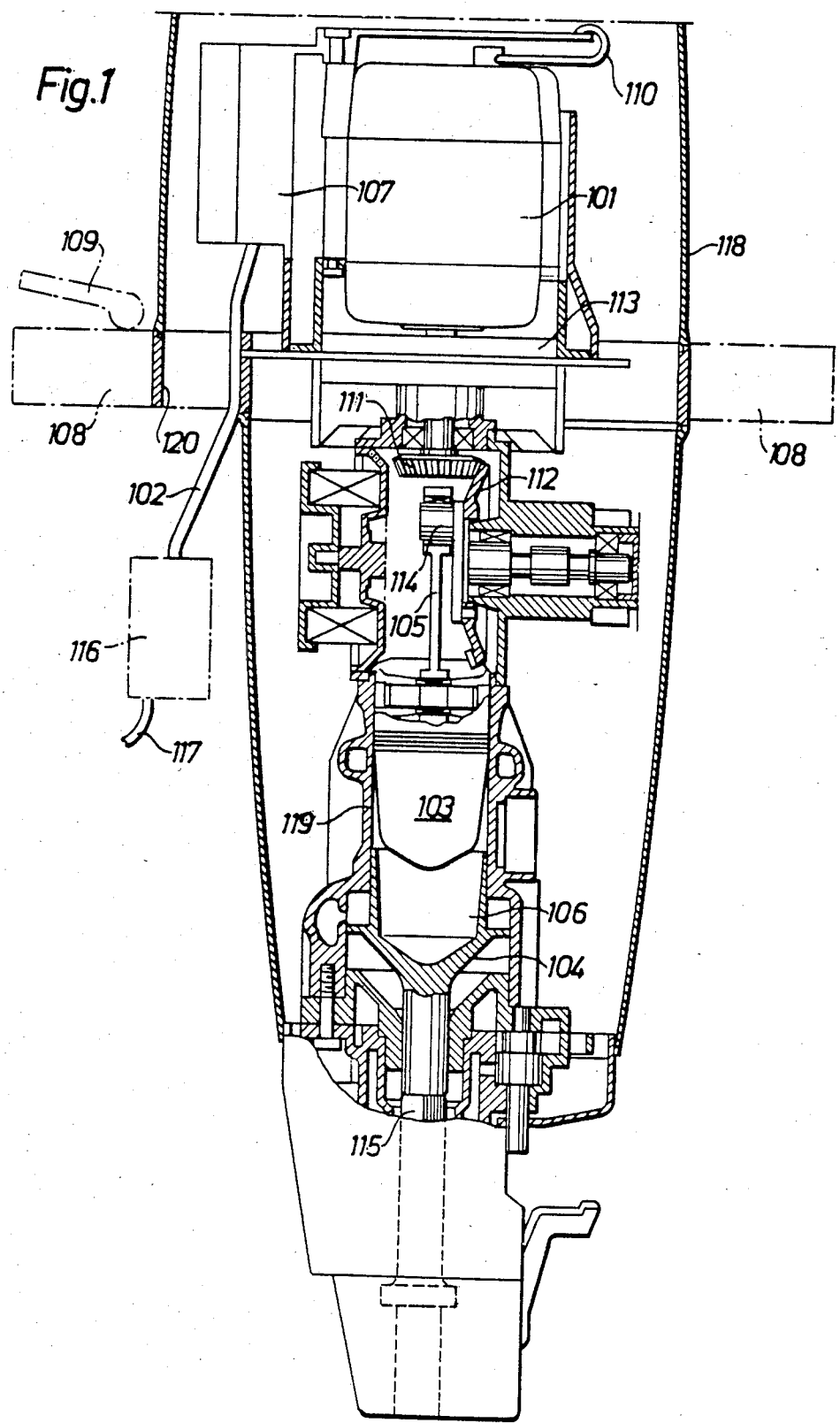

The hammer machine shown in FIG. 1 comprises a machine housing 119 in which a driving piston 103 and a hammer piston 104 are axially movable. Hammer piston 104 is driven against a tool 115 by the driving piston via elastic means in form of a pressure gas cushion 106. The driving piston is driven by a brushless alternating current motor 101 via gear wheels 111, 112 and crank mechanism 114, 105. The crank pin 114 is eccentrically arranged on gear wheel 112. Connecting rod 105 is connected to crank pin 114 and to driving piston 103. A hood 118 is provided to attenuate noise emission and to direct cooling air inside the machine. Cooling air is taken in through inlet opening 120 and passed across the inverter 107. This unit also comprises a controller 10, FIG. 4, and other electronics. The cooling air is then passed through the motor. The cooling air flow is driven by a fan 113 connected to the shaft of the motor. The cooling air flow is then passed over the hammer mechanism and leaves the machine at the bottom thereof. Motor 101 is supplied with power of variable amplitude and frequency through conduits 110 connected to inverter 107. The inverter, which is a solid state inverter, is placed in the power supply conduit 102. Alternatively an inverter 116 situated outside the machine could be used. Conduit 117 is connected to the mains supply. The machine is further provided with handles 108 and a lever 109 for controlling the speed of the motor.

Figure 2:
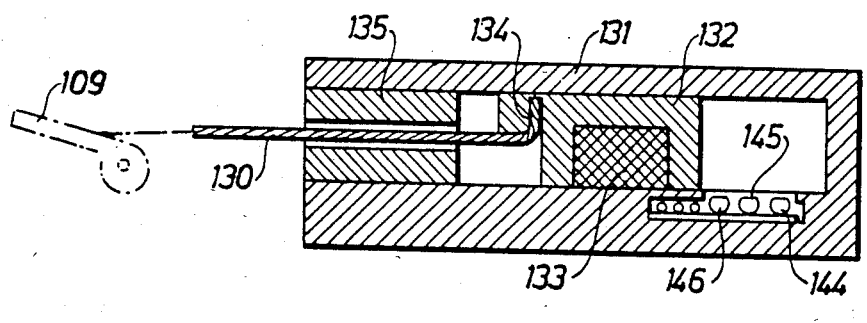
FIG. 2 shows an actuator of the machine according to FIG. 1.
Figure 3:
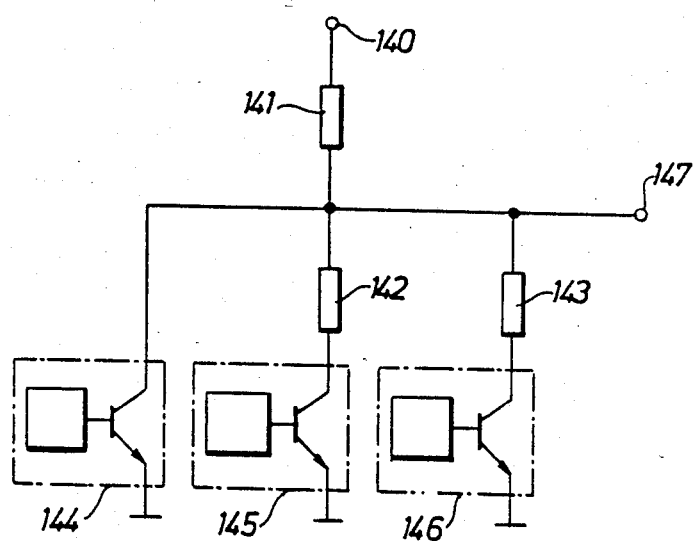
FIG. 3 shows the actuator in diagrammatic form.

The machine incorporates an actuator 131 comprising an outer tube 131 in which a magnet 133 in a magnet holder 132 is axially movable across a number of magnetically actuated switches 144, 145 and 146. The magnet holder has a hole 134 into which a thread 130 is inserted. The thread is further connected to lever 109 so that the position of magnet 133 is determined by the position of lever 109. Switches 144, 145, 146 are via resistors 141, 142, 143 connected to a voltage supply 140 and to an output terminal 147. Each of the switches comprises a Hall sensor, a Schmitt trigger and a switch transistor. This means that the switch can be in either of two states. It is in a conductive state when exposed to a magnetic field having a strength exceeding a predetermined level and otherwise in a nonconductive state. The output voltage at output terminal 147 is determined by the values of resistors 141, 142 143 and the number of switches being in a conductive state. With the magnet in the position shown in FIG. 2 no switch is conducting. Thus the output voltage is equal to the supply voltage at 140. This corresponds to maximum speed of the machine. When the magnet is in its other extreme position all switches conduct so that the output voltage is equal to zero. In this state the machine has stopped. Output terminal 147 is connected to input 19 on controller 10.

Figure 4:
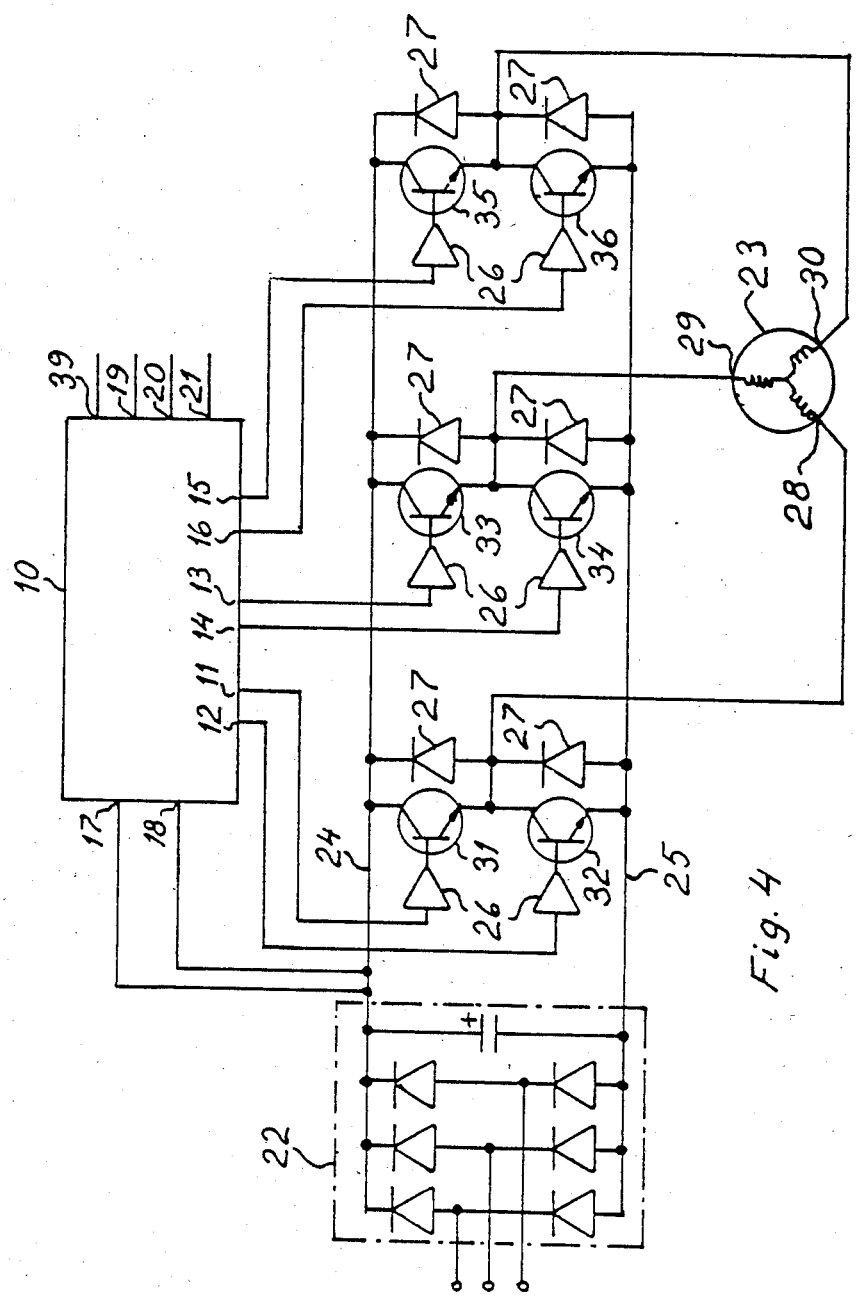
FIG. 4 shows the motor drive system.
Figure 5:
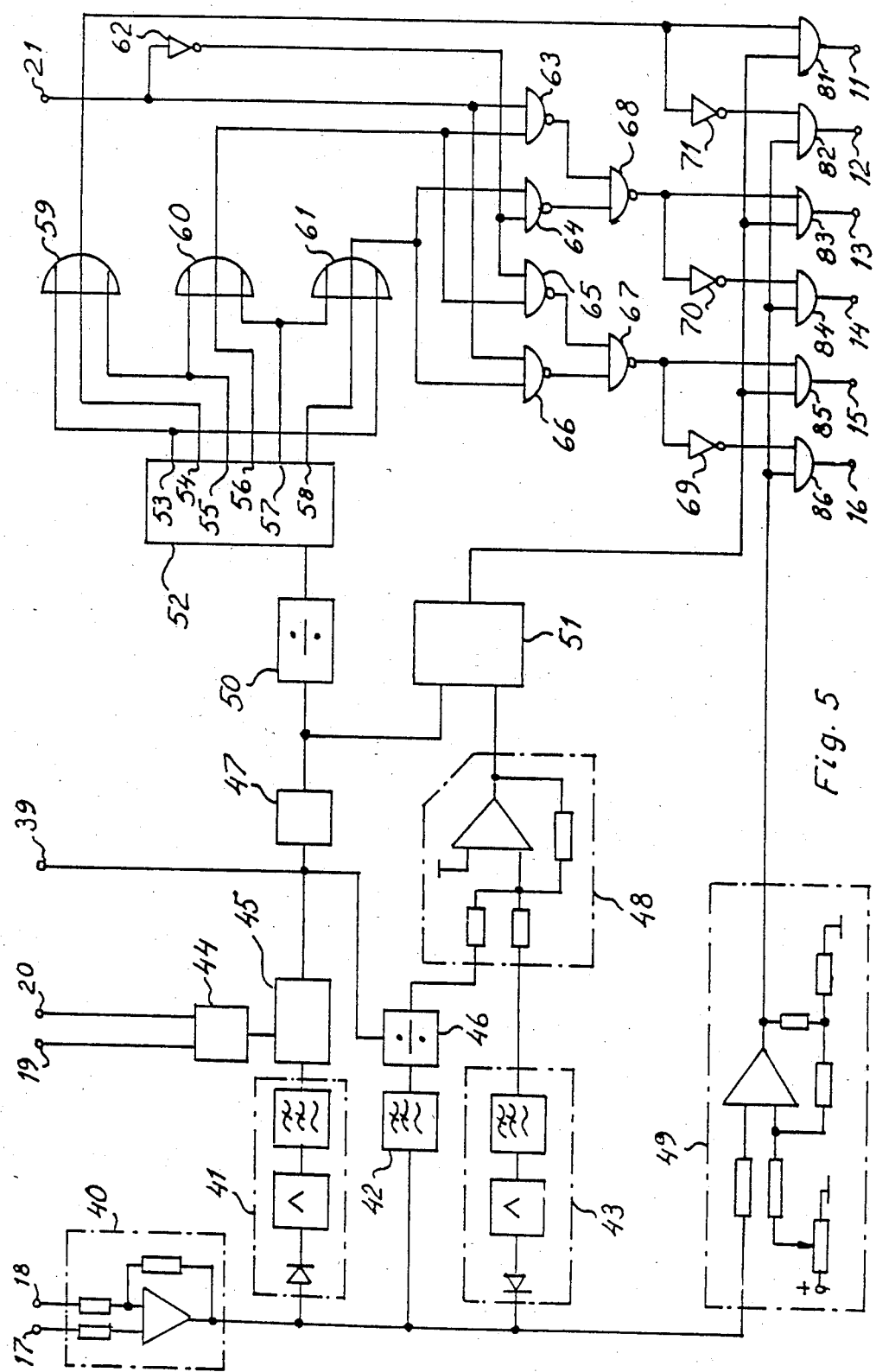
FIG. 5 shows the controller of FIG. 4.

The drive system shown in FIG. 4 comprises a three-phase rectifier 22 which is connected to a standard fixed frequency mains supply. The rectifier delivers direct current of substantially constant voltage to conduits 24, 25, which constitute a positive 24 and a negative 25 terminal of a direct current supply for an inverter. The inverter comprises six switching elements 31–36 for successively connecting motor terminals 28, 29, 30 on a brushless alternating current motor 23 to the positive terminal 24 and the negative terminal 25 of the direct current supply. The switching elements are in the drawing shown as transistors but could, of course, be combinations of thyristors or other elements. A diode 27 is placed in anti-parallel over each transistor to take care of reactive currents at the switching off of the transistor. To control the inverter, control signals are supplied from outputs 11–16 on a controller 10 as shown in FIG. 5. These control signals are supplied via amplifiers 26 to the base of respective transistor. Controller 10 is provided with inputs 17, 18 through which the direct current in conduit 24 is sensed. Controller 10 is further provided with an output 39 and inputs 19, 20, 21. Output 39 is only used if it during operation is desired to change the direction of rotation of the motor. The direction of rotation is selected by applying a logical signal to input 21. If rotation in only one direction is desired input 21 is connected either to a positive voltage or common. The speed of motor 23 may be changed by variation of a voltage applied to input 19. If, as for instance in a grinding machine, it is desired to drive the motor at a certain speed, input 19 is connected to a suitable voltage corresponding to the desired speed. Input 20 is intended for receiving a start/stop signal by which rotation or no rotation is chosen. If start/stop is selected by means of the voltage applied to input 19, input 20 is connected to a voltage corresponding to rotation of the motor.

Controller 10, which is shown more in detail in FIG. 5, comprises a sensing means 40 for sensing the direct current in conduit 24. This current is presented as a voltage between inputs 17 and 18. The output signal of sensing means 40 is applied to a first peak detector 41, a low-pass filter 42, a second peak detector 43 and a comparator 49. Peak detectors 41 and 43 comprise diodes to react on positive and negative signals respectively. The peak detectors also comprise low-pass filters. First peak detector 41 preferably has a time constant of about 4/f where f is the maximum fundamental frequency of the current supplied to motor 23. The cut-off frequency, −3 dB, of peak detector 41 is preferably about 0.1 f. Lowpass filter 42 preferably has about the same cut-off frequency. Second peak detector 43 preferably has a time constant of about 1/f and a cut-off frequency of about 0.5 f.

Figure 6:
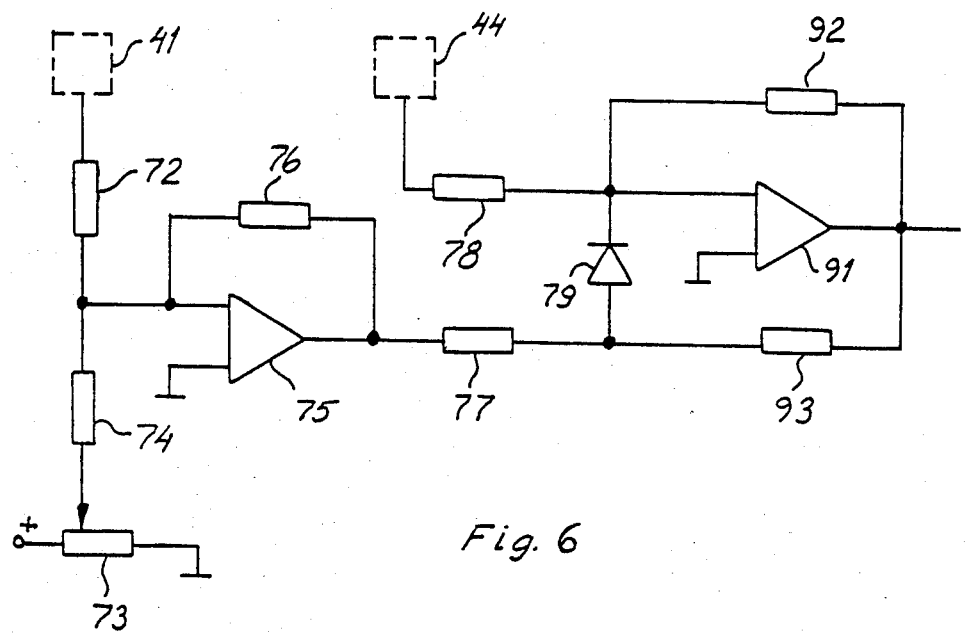
FIG. 6 shows a regulator of FIG. 5.

The peak value signal from peak detector 41 is supplied to a first regulator 45, which is shown more in detail in FIG. 6. Input signals from inputs 19 and 20 are supplied to a means 44 in form of a ramp generator. Ramp generator 44 comprises one or two operational amplifiers connected as integrators to supply regulator 45 with an increasing ramp voltage at motor start acceleration and a decreasing ramp voltage at motor stop deceleration. In this way it is possible to avoid that the normal speed maximum load current is exceeded when the motor is started or stopped. A change in the speed demand signal at input 19 is also integrated by ramp generator 44. Thus it takes some time before the output of ramp generator 44 becomes fully adapted to the input signals.

Figure 7:
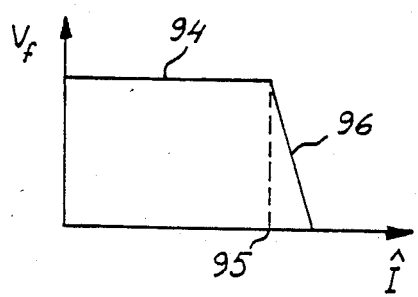
FIG. 7 shows a transfer function for the regulator according to FIG. 6.

The peak value signal from first peak detector 41 is applied to one of the inputs of operational amplifier 75 via resistor 72. This signal is compared with a reference signal preset on variable resistor 73 and fed to the amplifier via resistor 74. The amplifier is provided with a feed-back resistor 76. The output signal of amplifier 75 is via a resistor 77 applied to diode 79. The output signal from ramp generator 44 is via resistor 78 supplied to one of the inputs of operational amplifier 91. Amplifier 91 is provided with a first feed-back resistor 92 and a second feed-back resistor 93 in series with diode 79. Resistor 93 has a much lower resistance than resistor 92. Preferably the ratio is about 1/20. If the output signal from amplifier 75, measured at diode 79, is more negative than the output signal from amplifier 91, measured at diode 79, is positive, diode 79 is reverse-biased. The closed loop amplification of amplifier 91 is then high. Regulator 45 then operates according to line 94 in FIG. 7, assuming constant signal from ramp generator 44. If the signal from first peak detector 41 increases, the output signal from amplifier 75 becomes less negative and at a certain signal level, level 95 in FIG. 7, which is preset on resistor 73, diode 79 becomes forward-biased. The closed loop amplification of amplifier 91 is now drastically reduced so that first regulator 45 delivers a frequency controlling signal according to line 96 in FIG. 7. This signal becomes zero at about 120% of the signal at level 95. The frequency controlling signal from the output of amplifier 91 is delivered to a voltage-controlled oscillator 47, output 39 and an analog divider 46, e.g. Analog Devices AD 534. The voltage-controlled oscillator produces an output signal whose frequency is proportional to the input voltage.

The rectified means value signal obtained from low-pass filter 42 corresponds to the power supplied to motor 23 because the voltage of the direct current supply 24, 25 is substantially constant. This signal is supplied to divider 46 where it is divided with the frequency controlling signal, which is the demand signal for rotational speed of motor 23. The output signal of divider 46 will thus correspond to the torque demand from motor 23. This output signal, first voltage controlling signal, is supplied to a second regulator 48. The negative peak value signal, second voltage controlling signal, obtained from second peak detector 43 is also supplied to regulator 48 so that the output signal of regulator 48 beomes proportional to the difference between the first and the second voltage controlling signals. The negative peak value signal from peak detector 43 corresponds to the degree of magnetization of motor 23. This signal is obtained from negative pulses which are fed back to the direct current source when the transistors 31–36 are switched off. By controlling the level of these negative pulses it is possible to obtain a predetermined level of magnetization of the motor allowing both a high power to weight ratio and the avoiding of oversaturation, which would give unacceptable losses.

If the signal from sensing means 40 exceeds a predetermined level the output of comparator 49 becomes low. As a result outputs 12, 14 and 16 of AND gates 82, 84 and 86 respectively will be low. This means that the lower transistors 32, 34 and 36 of the inverter will be turned off so that the motor terminals 28, 29 and 30 will be cut off from the negative terminal 25 of the direct current supply. This cutting off thus functions as transient current protection for the inverter.

The output signal from voltage-controlled oscillator 47 is supplied to a timer 51, preferably an industrial timer of standard type 555, and to a divider 50. Divider 50 is preferably a programmable counter which delivers a pulse train having a frequency which is equal to the frequency of the input signal divided by a chosen constant. Timer 51 delivers a pulse train whose frequency is equal to the frequency of the output signal from voltage-controlled oscillator 47. The pulse width is controlled by the output signal from second regulator 48. This pulse train is supplied to AND gates 81, 83 and 85. The pulse train from divider 50 is supplied as clock signal to ring counter 52. In the ring counter a 1 and five 0's are stored. The 1 is shifted around by the pulse train from output 53 through 58 and back to 53. This makes one period of the fundamental frequency of the current supplied to motor 23. Outputs 53–58 of ring counter 52 are decoded by OR gates 59, 60 and 61. The output of each of these gates is high half the time and low half the time. A logic signal inverter 62 and NAND gates 63–68 are provided for selecting direction of rotation of motor 23. The output signals of gates 59, 60 and 61 are supplied to AND gates 81–86 for controlling the actuation of switching transistors 31–36 in the inverter. The inputs of gates 82, 84 and 86 are provided with logic signal inverters 71, 70 and 69 respectively.

Because the pulse width of the pulses leaving timer 51 remains constant independent of frequency if the signal from regulator 48 is constant, the mean value over half a period of the fundamental frequency of the voltage applied to any of the motor terminals will change simultaneously with the frequency as required by basic electromagnetic laws. Additional control of the mean value voltage is obtained by variation of the pulse width, which is controlled by regulator 48.

We claim:

1. An electrically driven hammer machine comprising an electric motor having a power supply, a hammer mechanism having a driving piston, an elastic means and a hammer piston, said hammer piston being driven in a reciprocative motion by said driving piston via said elastic means, the improvement comprising:

said motor being a brushless alternating current motor, said power supply comprising a solid state inverter for supplying said motor with power of variable amplitude and frequency, a controller connected to said solid state inverter for controlling the amplitude and frequency of the power supplied to said motor, an actuator for supplying a direct current signal to said controller for controlling said inverter and the amplitude and frequency of said power supplied to said motor in response to variations in said direct current signal, said actuator comprising a plurality of magnetically actuated switches for selecting the magnitude of said direct current signal whereby the speed of said motor is controlled to reciprocate said drive piston at various speeds.

2. The hammer machine as claimed in claim 1 having a housing, a fan mounted in said housing and driven by said motor for cooling said motor and said hammer mechanism.

3. The hammer machine as claimed in claim 2, in which solid state inverter and said controller are mounted in said housing to be cooled by said fan.

* * * * *